United States Patent [19]
Zheng et al.

US005636100A

[11] Patent Number: 5,636,100

[45] Date of Patent: Jun. 3, 1997

[54] CAPACITOR HAVING AN ENHANCED DIELECTRIC BREAKDOWN STRENGTH

[75] Inventors: Jian-Ping Zheng, Eatontown; T. Richard Jow, Chatham; Peter J. Cygan, Eatontown, all of N.J.

[73] Assignee: The United States of America as represented by the Secretary of the Army, Washington, D.C.

[21] Appl. No.: 495,289

[22] Filed: Jun. 27, 1995

Related U.S. Application Data

[63] Continuation of Ser. No. 278,488, Jul. 21, 1994, abandoned, which is a continuation-in-part of Ser. No. 135,228, Oct. 12, 1993, abandoned.

[51] Int. Cl.$^6$ ........................................... H01G 4/20
[52] U.S. Cl. ..................... 361/312; 361/311; 361/313; 361/321.2; 361/323; 428/209; 428/412; 428/421; 428/422; 428/426; 428/480; 428/483; 428/469
[58] Field of Search ................................ 361/312, 313, 361/323, 311, 321.2; 428/412, 421, 422, 480, 483, 426, 469, 209

[56] References Cited

U.S. PATENT DOCUMENTS

| | | | |
|---|---|---|---|
| 4,288,470 | 9/1981 | Bate et al. | 427/88 |
| 4,907,046 | 3/1990 | Ohji et al. | 357/23.6 |
| 4,931,897 | 6/1990 | Tsukamoto et al. | 361/313 |
| 4,937,650 | 6/1990 | Shinriki et al. | 357/51 |
| 5,102,722 | 4/1992 | Iida et al. | 428/215 |
| 5,144,523 | 9/1992 | Pageaud et al. | 361/308 |

*Primary Examiner*—D. S. Nakarani
*Attorney, Agent, or Firm*—Michael Zelenka; William H. Anderson

[57] ABSTRACT

A capacitor having an enhanced dielectric breakdown strength is obtained from a base dielectric film by coating the base dielectric film on both sides with an adherent coated dielectric film having a dielectric constant that is at least 50 percent higher than that of the base dielectric film and that adheres to the base dielectric film; and wherein metal foil is adherently joined to each of the coated dielectrics films to form electrodes for the capacitor.

11 Claims, No Drawings

CAPACITOR HAVING AN ENHANCED DIELECTRIC BREAKDOWN STRENGTH

GOVERNMENT INTEREST

The invention described herein may be manufactured, used, and licensed by or for the Government for governmental purposes without the payment to us of any royalty thereon.

FIELD OF THE INVENTION

This application is a continuation of U.S. patent application Ser. No. 08/278,488, entitled, "Capacitor having an Enhanced Dielectric Breakdown Strength," filed Jul. 21, 1994, Attorney Docket No. CECOM-5089, now abandoned, which is a continuation-in-part application of U.S. patent application Ser. No. 08/135,228 filed 12 Oct. 93 by JEAN-PING ZHENG, T. RICHARD JOW and PETER J. CYGAN for DIELECTRIC FILMS HAVING AN ENHANCED DIELECTRIC BREAKDOWN STRENGTH AND METHOD OF MAKING THE FILMS, now abandoned. This invention relates to capacitors having a high dielectric breakdown strength and made from a base dielectric film.

BACKGROUND OF THE INVENTION

The use of composite dielectrics, in particular the composite of paper and polymer film, to extend the life of electrostatic capacitors under high voltage stress is known. For example, U.S. Pat. No. 3,048,750 of Netherwood et al. discloses the use of a composite dielectric having one layer of dielectric with a volume resistivity of at least five times the volume resistivity of the dielectric of the other layer. In particular, one layer of nonporous polymer film having a high resistivity and one layer of porous paper having a low resistivity is filled with impregnates of low resistivity. The invention is to place an anode between layers of lower resistivity dielectric (layer-LR) and to place a cathode between layers of higher resistivity dielectric (layer-HR). This means that for a given voltage across a composite dielectric, 83% of the voltage should be across the layer-HR and 17% across the layer-LR. Since it is generally accepted in the art that degradation of an electrostatic capacitor takes place at the anode, this invention provides means to lower the electrical stress at the anode and thus extend the life of capacitors.

Yagitani in U.S. Pat. No. 3,857,073 further improves the overvoltage endurance over Netherwood et al. as above by having the same composite dielectric arrangement as that of Netherwood et al., except that one of a pair of electrode foils is narrower in width, with its both edges made recessed foil edges in relation to the other electrode and both of its surfaces kept in contact with paper (layer-LR).

Further improvement over Yagitani is made by Mercier et al. in U.S. Pat. No. 4,323,948 by having the narrower electrodes rounded and smooth edges such as by folding. Mercier et al. further associate the layer-LR to that of high dielectric constant and the layer-HR to that of low dielectric constant.

Each of U.S. Pat. Nos. 3,857,073, and 4,323,948 are directed to capacitors containing the composite dielectrics and the narrower electrodes in contact with the layer-LR. Particularly, the composite dielectric includes a layer of porous paper filled with impregnant and a layer of nonporous polymer film.

SUMMARY OF THE INVENTION

This invention relates to capacitors having an enhanced dielectric breakdown strength and consisting of a base dielectric film and another dielectric layer coated on the base dielectric film, wherein the coated dielectric layer or film is characterized by having a dielectric constant at least 50 percent higher than that of the base dielectric film such that the dielectric breakdown strength of the capacitor is greatly enhanced. Metal foil or metallized film adheredly joined to the coated dielectric films is used as electrodes for the capacitors.

The method of making such a capacitor can be summarized as follows. The surface of the base dielectric film must first be cleaned and/or even modified to allow the coated dielectric film to adhere to the base dielectric film. The selection of coating materials is essential. The dielectric constant of the coated dielectric materials is at least 50% higher than that of the base film. The type of coating material is not critical. It can be a polymer or an inorganic material. The method of coating is not critical. However, it is essential that the coating be of high quality, thin, and adhere to the base film. The method of coating includes coating from solution, coating using chemical vapor deposition, plasma polymer polymerization, a physical sputtering method, and other vacuum deposition methods etc. The coating from solution can include spin coating, spray coating, and dip coating.

It has been discovered that capacitors consisting of the base dielectric film and coated dielectric film with higher dielectric constant exhibit higher dielectric breakdown strength as compared to capacitors with the base dielectric film without such coating. Moreover, the capacitors using the dielectric films of this invention will be able to stand higher operating voltages and thus have higher energy density.

The capacitors of this invention consist of a base dielectric film that is coated with a coated dielectric film having a higher dielectric constant with metal foil or metallized film adhered to the coated dielectric film as electrodes. The dielectric films that are for use in capacitors or other high voltage devices are different from previous dielectric films. For example, the dielectric films of this invention are not composites. That is, the coated layer actually adheres to the base film and in many instances, it bonds chemically to the base film. The layer of lower resistivity (layer-LR) or higher dielectric constant in the composite dielectric disclosed in the past needs to be porous and needs to be filled with impregnant. In this invention, the coated layer is a solid and can be of high resistivity. No impregnant is needed in the instant invention. The enhancement in breakdown strength in this invention is independent of the width of the electrodes or the arrangement of the electrodes. Furthermore, in the instant invention, the breakdown voltage of the capacitor is greater than the sum of breakdown voltages for the individual dielectric films.

In the instant invention the surface condition of the base dielectric film is critical. The surface needs to be cleaned or modified for the coating to adhere to it. The surface must be free of dust or contamination. The surface cleaning can be done by methods such as wet or chemical cleaning, plasma cleaning, or their combination. Depending on coating materials, modification of the surface of the base films may be needed for good adherence.

The selection of coating method is determined by the material to be coated and the base dielectric film. For example, in coating polyvinylidene fluoride (PVDF) onto polyetherimide (PEI) film, solution coating of the PVDF containing solution onto PEI film can be used. The selection of solvent is critical; that is, the solvent should dissolve PVDF. At the same time, it should also wet the PEI surface such that the PVDF polymer film can adhere to it.

Coating methods using vacuum deposition techniques such as sputtering of inorganic or plasma polymerized polymer materials onto base films, and plasma cleaning or plasma modification can be employed. For example, to coat barium titanate onto polyethylene naphthalate (PEN), the surface of PEN can be plasma modified to promote barium titanate to adhere to the PEN surface.

Various coating methods are known by people skilled in the art of coating or bonding. In any method used, it is critical to have the coated dielectric material adhere or bond to the base dielectric film. Any void or defect at the interface between the coated and the base films can reduce the breakdown strength.

The dielectric constant of the coated dielectric material is critical. The dielectric constant of the coated material should be at least 50% higher than that of the base film. The coated material can be an inorganic dielectric or a polymer dielectric film. The base dielectric film can also be a polymer or an inorganic dielectric film. Examples of base dielectric films that are polymers include polyethylene (2.2) polypropylene (2.2), PEN (3.0), polyamide (3.5), polycarbonate (3.2), PEI (3.0), polyethylene terephthalate (3.2–3.5), polystyrene (2.4–2.7), polysulfone (3.1), polyethersulfone (3.5), polyphenylene sulfide (3.0), polyurethane (3–7), polyvinyl chloride (4–8), fluoropolymers (2.0–2.6), polyvinylidene fluoride (6–11), vinylidene fluoride copolymers (11–16), cellulose acetate (3.6), and cellulose triacetate (3.2–4.5). The numbers in the parentheses are the dielectric constant of the dielectric materials. Examples of base dielectric films that are inorganics include aluminum oxide (7.0), silicon dioxide (3.9), tantalum oxide (11) silicon nitride, titanium oxide, and diamond-like-carbon (3.5–7).

Examples of dielectric materials of the coated dielectric layer include PVDF (11), vinylidene fluoride copolymers (11–16), tantalum oxide (11), cyano cellulose (16–22), barium titanate (100–500), lead titanate (100–500), strontium barium titanate (100–500), polymer/ceramic composite (6–10), etc.

The breakdown strength tests of the dielectric films of this invention, i.e. the dielectric film that is coated with another dielectric having a higher dielectric constant, are performed according to ASTM standards. All breakdown tests are conducted using round (0.8 mm radius) brass electrodes, 6.35 mm in diameter to reduce the local electrode field caused by the edge effect. The weight of the upper electrode is 50±2 grams, 0 as required by the standards. All measurements are conducted in silicone oil. A Spellman power supply (50 kV, 6 mA) is used, with its voltage rate controlled by a voltage programmer. During the measurements, the voltage is increased at a rate of 500 V/sec until breakdown occurs. A 10 megohm resistor is inserted in series with the test sample to limit the current. The onset of a 4 microamper discharge current is used as the criterion for defining breakdown voltage. The dc breakdown event itself is monitored on the Nicolet storage oscilloscope using a Nicolet HV15HF high voltage probe. At least eight points are measured for each sample. The reported values are the averages and the corresponding standard deviations.

DESCRIPTION OF THE PREFERRED EMBODIMENT

PEI (dielectric constant 3.0) film of a thickness of 26 micrometers is washed with acetone and methanol to clean the dust and the contamination off the surface. The PEI film is then mounted on a polished silicon wafer to have a flat surface. The PVDF (dielectric constant 11) coating solution is prepared by dissolving PVDF resin in dimethyl sulfoxide solvent. The PVDF film is then solution cast on PEI film by a spin coating method that is suitable for small area application. For industrial mass production, other methods such as doctor blade and dip coating should be used. The polymer laminate (the combined base PEI film and coated PVDF film) is then dried at 70° C. under vacuum for about one hour. The thickness of the PVDF coating can be controlled from 0.1 to 2.0 micrometers by simply adjusting the concentration of the solution and the spin speed. The dc breakdown strength of the PEI laminate having different thicknesses of PVDF coating are tested using the ASTM method as described. The breakdown is calculated to be the voltage divided by the effective thickness. The effective thickness is defined as follows, $$d_{\mathit{eff}} = d_1 + d_2 \cdot \epsilon_1 / \epsilon_2$$

where $d_1$ and $d_2$ are the thicknesses of the base dielectric film and the coated PVDF film respectively. $\epsilon_1$ and $\epsilon_2$ are the dielectric constants of the base dielectric film and the coated dielectric film, respectively. The breakdown strengths of the PEI films with and without the PVDF coatings (in the range of 0.15 to 1.0 micrometers) are 5.85(0.18) and 4.86 (0.09) MV/cm, respectively. The numbers indicated in the parenthesis are the standard deviations. This represents a 20% enhancement in breakdown strength for the PVDF coated PEI compared to non-coated PEI film. The enhancement is found to be insensitive to the thickness of the PVDF coatings.

EXAMPLE I

PEI films, of thicknesses of 6.7, 13.2, and 26.4 micrometers, coated with PVDF are prepared according to the method as described in the preferred embodiment. The thickness of the coated PVDF film is 0.15 micrometer. The breakdown strength of the 6.7 micrometer PEI films with and without PVDF coatings are 5.81(0.54) and 4.69(0.46) MV/cm, respectively. The breakdown strength of the 13.2-micrometer PEI films with and without PVDF coatings are 5.82(0.42) and 5.00(0.30) MV/cm, respectively. The breakdown strength of the 26.4-micrometer PEI films with and without PVDF coatings are 5.63(0.17) and 4.86(0.09) MV/cm, respectively. These results indicate that the breakdown of the PVDF-coated-PEI films is independent of the thickness of the polymer base film.

EXAMPLE II

PEN film coated with PVDF film is prepared according to the method as described in the preferred embodiment. The thickness of the PVDF coating is measured at 0.3 micrometer. The breakdown strengths of the PEN films with and without the PVDF coatings are 6.43(0.80) and 5.44(0.36) Mv/cm, respectively. This represents an 18% enhancement in breakdown strength for the PVDF 0 coated PEN compared to non-coated PEN film.

EXAMPLE III

PET film coated with PVDF film is prepared according to the method as described in the preferred embodiment. The thicknesses of the PVDF coatings are 0.05 and 0.1 micrometer. The breakdown strengths of the PET films with and without the PVDF coatings are 7.11(0.33) and 6.56(0.48) MV/cm, respectively. This represents an 8% enhancement in breakdown strength for the PVDF coated PET compared to non-coated PET film.

It should be pointed out that, according to the invention, the base dielectric film may be a polymer film or an inorganic film. Similarly, the coated dielectric film may be a polymer film or an inorganic film.

We wish it to be understood that we do not desire to be limited to the exact details of construction shown and described for obvious modifications will occur to a person skilled in the art.

What is claimed is:

1. A capacitor having an increased dielectric breakdown strength consisting of:

a cleaned base dielectric film having at least two major surfaces and having a first dielectric constant;

a solid coating on the base dielectric film, the coating covering the two major surfaces, thereby sandwiching the base dielectric film, and the coating having a second dielectric constant which is at least 50% greater than the first dielectric constant of the base dielectric film, wherein a breakdown voltage of a composite of the base dielectric film and the coating is greater than a sum of breakdown voltages for the coating and the base dielectric film taken individually, wherein each of the coatings has an outer surface; and metal foil adheredly bonded to each of said outer surface of the coatings to form electrodes for the capacitor.

2. A capacitor according to claim 1 wherein the base dielectric film is selected from the group consisting of polymers and inorganics.

3. A capacitor according to claim 2 wherein the polymer of the base dielectric film is selected from the group consisting of polyethylene, polypropylene, polyethylene naphthalate, polyamide, polycarbonate, polyetherimide, polyester, polystyrene, polysulfone, polyethersulfone, polyphenylene sulfide, polyurethane, fluoropolymer, polyvinylidene fluoride, vinylidene fluoride/trifluoroethylene copolymer, polyvinyl chloride, cellulose acetate, and cellulose triacetate.

4. A capacitor according to claim 2 wherein the inorganic of the base dielectric film is selected from the group consisting of aluminum oxide, silicon dioxide, silicon nitride, tantalum oxide, and titanium oxide.

5. A capacitor according to claim 2 wherein the coating is selected from the group consisting of polymers and inorganics.

6. A capacitor according to claim 5 wherein the polymer of the coating is selected from the group consisting of polyvinylidene fluoride, vinylidene/trifluoroethylene copolymer, vinylidene/tetrafluoroethylene copolymer, cyanoethyl cellulose, cyanoethyl polyvinyl alcohol, cyanoethyl hydroxyethyl cellulose, polyvinyl chloride, and polyurethane.

7. A capacitor according to claim 5 wherein the inorganic of the coating is selected from the group consisting of aluminum oxide, tantalum oxide, titanium oxide, barium titanate, lead titanate, strontium barium titanate, and glasses.

8. A capacitor according to claim 1 wherein the base dielectric film is polyetherimide and wherein the coating is polyvinylidene fluoride.

9. A capacitor according to claim 1 wherein the base dielectric film is polyethylene terephthalate and wherein the coated dielectric film is polyvinylidene fluoride.

10. A capacitor according to claim 1 wherein the base dielectric film is polyethylene naphthalate and wherein the coated dielectric film is polyvinylidene fluoride.

11. A capacitor according to claim 1 wherein the metal foil electrodes are formed by evaporation of the metal onto said outer surface of the coatings.

* * * * *